UNITED STATES PATENT OFFICE.

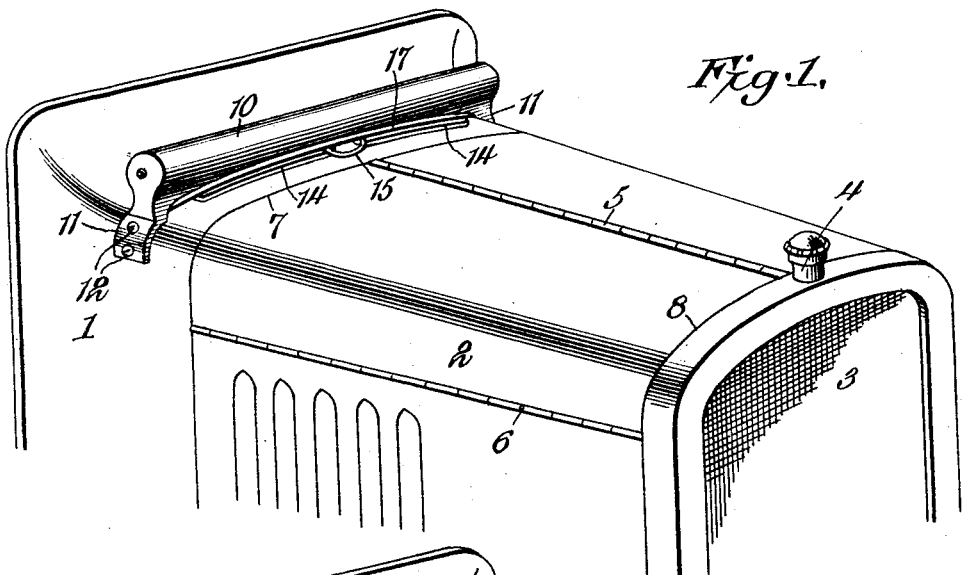
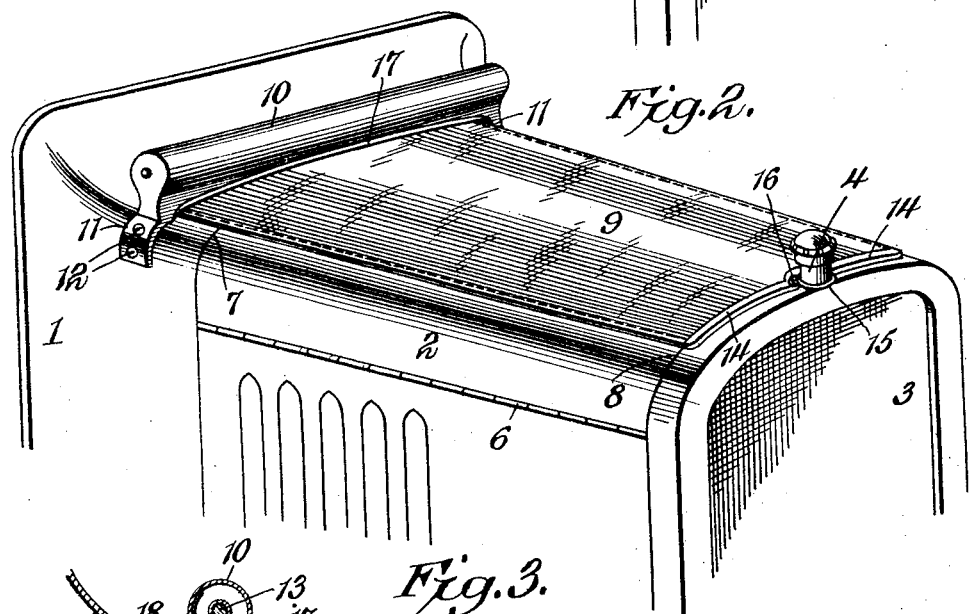
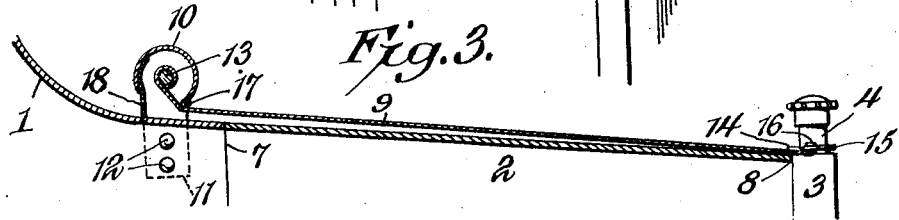

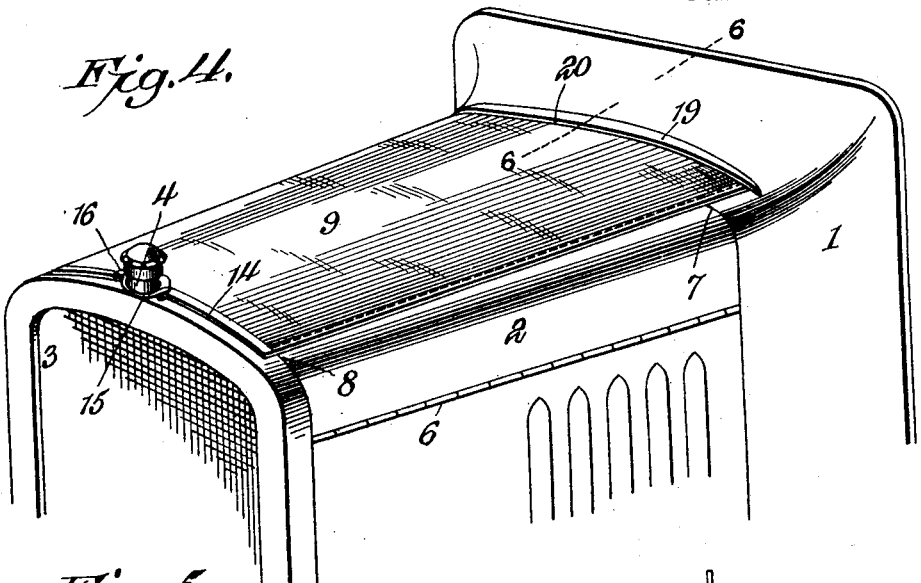
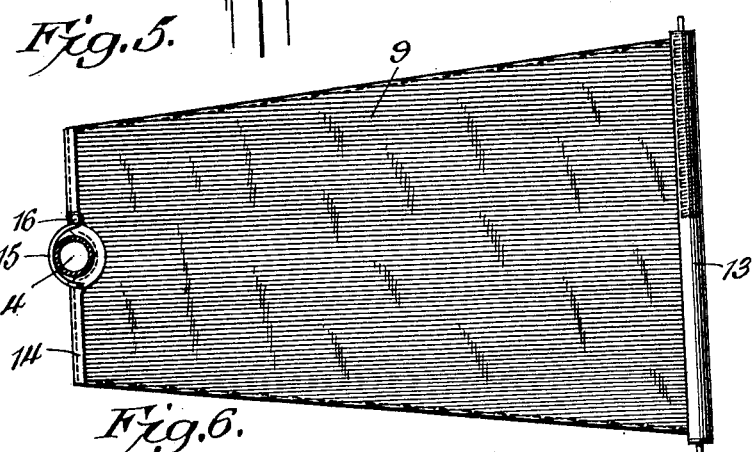
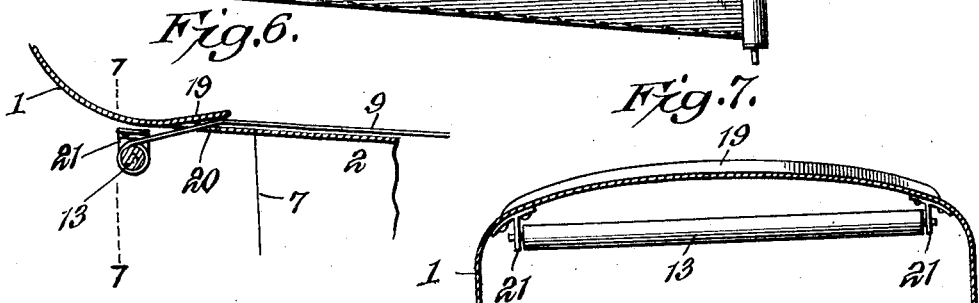

GEORGE F. MANSFIELD, OF PASCAGOULA, MISSISSIPPI.

RAINPROOF HOOD-COVER FOR AUTOMOBILES.

1,399,358.

Specification of Letters Patent.  Patented Dec. 6, 1921.

Application filed April 11, 1919. Serial No. 289,397.

*To all whom it may concern:*

Be it known that I, GEORGE F. MANSFIELD, a citizen of the United States, residing at Pascagoula, in the county of Jackson and State of Mississippi, have invented a new and useful Rainproof Hood-Cover for Automobiles, of which the following is a specification.

This invention has reference to rain-proof hood covers for automobiles and its object is to provide means whereby access of rain through the joints between the hood and the body of the automobile is prevented, with the cover forming a permanent part of the automobile and without necessitating removal of the cover in order to readily open and close the hood.

In automobiles, hoods are provided to cover various essential parts of the automobile and are jointed structures so that ready access to such parts may be had whenever required. The joints and hinges which become necessary to provide for the ready opening of the hood also afford ready access to rain water and such rain water is frequently detrimental to the proper working of the electrical side of the automobile, because giving rise to short circuits or leaks which in some instances are serious enough to put the electrical side of the vehicle entirely out of commission.

The invention provides an extensible and retractible hood cover which, when extended, entirely covers and protects the hinges and joints of the hood from access of rain water where such access is harmful, and when the hood cover is retracted it is so far out of the way as to interfere in nowise with the opening and closing and even the removal of the hood. The cover, when in the retracted position, is located on the forward part of the automobile body forward of the windshield and either above or below such portion of the body. The cover is so shaped and has such an area and degree of extension as to protect spark coils where located under the front of the body, distributing conductors where disposed on the dash and under the hood, and spark plugs where so situated on the automobile engine as to be liable to be affected by accumulations of water finding access thereto through the hood.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claim.

In the drawings:—

Figure 1 is a perspective view of an extensible and retractible hood cover arranged as a permanent attachment to the automobile, the structure being shown with the cover in the retracted position.

Fig. 2 is a view similar to Fig. 1, but with the hood cover extended.

Fig. 3 is a longitudinal section, on the near side of the center line, of the arrangement shown in Fig. 2.

Fig. 4 is a view similar to Fig. 2, but showing a modified form.

Fig. 5 is a plan view of the extended hood cover attached at its forward end to the filling tube of the radiator, said filling tube being shown in cross section.

Fig. 6 is a section on the line 6—6 of Fig. 4.

Fig. 7 is a section on the line 7—7 of Fig. 6.

Referring to the drawings, there is shown the forward portion 1, the hood 2 and the radiator 3 of an automobile body, the radiator being also shown as provided with the usual filling tube 4. Hoods ordinarily have a longitudinal central hinge connection 5 and the sides of the hood each have another longitudinal hinge connection 6 with the top portion thereof so that either side of the hood may be raised and folded back to expose the interior mechanism usually covered by the hood. Where the hood meets the body portion 1 there is a joint 7, and where it meets the radiator there is a joint 8. The hinge connections 5 and 6 and the joint 7, even though the joint 7 be provided with packing upon which the hood rests, there are almost always spaces where rain water will beat in or simply gravitate into the interior of the hood. The result is that electric wires, spark coils, and spark plugs located beneath or adjacent to the hood are liable to and often do become wet, with the result that there is leakage of current which at times may become sufficient to actually prevent the proper functioning of the electrical side of the automobile. This is particularly objectionable where it prevents starting of the automobile or cuts out one or more cylinders, causing irregular running of the automobile.

To obviate these difficulties there is provided a hood cover 9 which may consist of a sheet of water-proof flexible material, such as is used for side curtains on automobile tops and for other pruposes about automobiles, or any other suitable material may be employed.

On the body member 1 back of the hood there is secured, in the construction shown in Figs. 1, 2 and 3, a casing 10 which may be of elongated cylindrical form with terminal brackets 11 so arranged that they may be readily secured to the body member 1 by bolts 12 or otherwise, the boring of holes for the passage of the bolts 11 representing the only work required upon the automobile to permit the attachment thereto of the hood cover. Within the casing 10 there is mounted a roller 13 which may be of the same character as a well known type of spring shade roller. Attached to this roller is the rear end of the cover 9, which appears spread out in plan view, together with the roller, in Fig. 5. Since automobile hoods of present type taper toward the front end, the cover 9 may correspondingly taper. Such a cover being relatively wide at the rear end and narrow at the front end will readily roll up on the roller 13 and may be as readily withdrawn therefrom. This cover is long enough to reach from the roller 13 to or very close to the radiator filling pipe 4. The front edge of the cover 9 has a stiffening strip 14 applied thereto and this stiffening strip may have a sufficient bend to conform to the top of the radiator or to the top of the hood close to the radiator where such parts are normally curved, or this strip may be otherwise shaped to agree with the shape of the hood, or radiator, or both. Pivotally fast to the strip 14 is one end of a hook 15 of a length and curvature to pass about the filling pipe or nozzle 4. The other end of the hook or loop 15 is shaped to engage about a pin 16 on the strip 14 and thus hold the hood cover in the extended position. On releasing the hook or loop 15 from about the filling nozzle 4 the spring roller will draw the cover into the casing 10 until stopped by the engagement of the strip 14 against the body member 1 and the bottom edge of the body casing 10 which is spaced from the body member 1 only to such extent as may be necessary to pass the hood cover, thus avoiding liability of rain beating in at such part. In order to avoid damage to the cover 9 when moving into and out of the casing 10, the latter, where adjacent to the body member 1, is formed with a longitudinal bead 17. To avoid the entrance of water to the space beneath the casing 10 the latter has fast thereto a longitudinally disposed strip 18 of flexible material, such as rubber or rubberized cloth, of a sufficient width to have its lower edge bear upon the body member 1.

As seen in Fig. 3, the upper face of the cover scrapes or rubs against the bead 17 when the cover is either withdrawn from or wound upon the spring roller. This engagement of the cover and the bead has the practical advantage in that as the cover is wound up on the spring roller its upper surface which might be laden with moisture or with dust is wiped off. Obviously if the cover is rolled up while wet it will rot and will have a short life. By designing the spring roller in relation to the body so that the bead wipes the surface of the cover clean the drops of moisture are wiped off and the cover has a longer life.

In the structure of Fig. 1 and associated figures means are provided whereby the hood cover may be obtained as an attachment and be applied to existing automobiles without any change except the boring of holes for the bolts 12. This of course necessitates the exposure of the casing 10 in plain view.

In order to provide a hood cover structure particularly adapted to automobiles when manufactured, the arrangement of Fig. 4 and associated figures may be provided. The body portion 1 of the automobile has a crosswise lip 19 at the forward end a short distance back of the radiator cover, thus providing a passageway 20 to the space under the top of the forward end of the body. Fast to the underside of the upper portion of the forward end of the body are roller brackets 21 of the type adapted to the spring roller 13, and the cover 9 is carried through the passage 20 and onto the roller 13 supported in the brackets 21. In other respects the arrangement is the same as that shown in Fig. 1 and associated figures, and the same reference numerals are used in Fig. 4 and associated figures for those parts which are the same as those which have been described with reference to Fig. 1.

It will be clear that the hood cover shown in the first three figures of the drawing will shed substantially all water which might find its way into joints 5, 7 and 8. The modified form of Figs. 4, 6 and 7 will also protect these joints. The passage 20 is narrow so that it is almost impossible for any water to pass between the lip 19 and cover 9; but should any water so pass, it will be delivered back of the roller 13, and away from the electrical parts of the machine.

What is claimed is:—

A rainproof cover for an automobile hood, comprising a flexible section, a spring roller to which one end of the flexible section is attached, a casing for the spring roller attached at its ends to the forward end of the body of the automobile, said casing having an edge spaced from said body and provided with a bead, the upper side of the flexible section engaging the said bead when the section is being withdrawn from or returned to the casing, and a watershed provided on the rear of the casing, said watershed comprising a strip of flexible waterproof material and adapted to bear upon the body portion of the vehicle to divert water from beneath the casing, said flexible section having a stiffening strip at the outer edge, said stiffening strip engaging between said bead and said hood when the section is wound upon the spring roller.

In testimony that I claim the foregoing as my own, I have hereto affixed my signature.

GEO. F. MANSFIELD.

Witnesses:
GIOVANNI RAGUSIN,
E. VIELLON.